(12) United States Patent
Reiner et al.

(10) Patent No.: US 10,127,719 B2
(45) Date of Patent: Nov. 13, 2018

(54) CREATING A SYNTHETIC MODEL WITH ORGANIC VERACITY

(71) Applicant: Technion Research & Development Foundation Limited, Haifa (IL)

(72) Inventors: Miriam Reiner, Haifa (IL); Tatiana Gelfeld, Tirat Carmel (IL)

(73) Assignee: Technion Research & Development Foundation Limited, Haifa (IL)

( * ) Notice: Subject to any disclaimer, the term of this patent is extended or adjusted under 35 U.S.C. 154(b) by 738 days.

(21) Appl. No.: 14/294,161

(22) Filed: Jun. 3, 2014

(65) Prior Publication Data
US 2014/0354637 A1   Dec. 4, 2014

Related U.S. Application Data

(60) Provisional application No. 61/830,669, filed on Apr. 6, 2013.

(51) Int. Cl.
*G06T 7/20*   (2017.01)
*G06T 17/00*  (2006.01)
*G06T 17/10*  (2006.01)

(52) U.S. Cl.
CPC ............... *G06T 17/10* (2013.01); *G06T 7/20* (2013.01); *G06T 17/00* (2013.01); *G06T 2200/08* (2013.01); *G06T 2210/56* (2013.01)

(58) Field of Classification Search
None
See application file for complete search history.

(56) References Cited

U.S. PATENT DOCUMENTS

| 5,592,597 A | * | 1/1997 | Kiss | G06T 15/04 345/419 |
| 8,854,368 B1 | * | 10/2014 | Russell | G06T 15/005 345/426 |

(Continued)

OTHER PUBLICATIONS

Partial European Search Report Under Rule 64 EPC dated Jun. 23, 2015 From the European Patent Office Re. Application No. 14170766.1.

(Continued)

*Primary Examiner* — Ke Xiao
*Assistant Examiner* — Jed-Justin Imperial (57) ABSTRACT

A method of creating a real time synthetic model tracking a dynamic physical entity, comprising:
a) Receiving multiple points extracted from a sequence of 3D information depicting a dynamic physical entity, each point is associated with position and photometric information.
b) Identifying, within the multiply of points, a cloud point which includes multiple entity representative points which portray a surface of the dynamic physical entity.
c) Generating a points-surface for a synthetic model by creating spatial presentation of the entity representative points through calculation of principal curvatures for each entity representative point according to the respective position information.
d) Generating a continuous surface for the synthetic model by texturing ellipsoidal shapes created for each entity representative point according to the respective photometric information.
e) Tracking motion of the dynamic physical entity by adjusting the points-surface and the continuous surface through iterations wherein in each iteration steps a)-d) are performed.

16 Claims, 5 Drawing Sheets

(56) References Cited

U.S. PATENT DOCUMENTS

2010/0082345 A1* 4/2010 Wang ............... G10L 13/00
704/260
2010/0302247 A1 12/2010 Perez et al.
2014/0015833 A1* 1/2014 Kang ............... G06T 17/20
345/420

OTHER PUBLICATIONS

Adamson et al. "Anisotropic Point Set Surfaces", Proceedings of the 4th International Conference on Computer Graphics, Virtual Reality, Visualization and Interaction in Africa, AFRIGRAPH '06, XP055193201, p .7-13, 2006. p .9-10, Fig.6.

Coconu et al. "Hardware-Accelerated Point-Based Rendering of Complex Scenes", Proceedings of the Thirteenth Eurographics Workshop on Rendering, EGWR '02, XP001232378, Workshop 13: 43-52, Jun. 26, 2002. Abstract.

Cruz et al. "Kinect and RGBD Images: Challenges and Applications", Proceedings of the 2012 25th SIBGRAPI Conference on Graphics, Patterns and Images Tutorials, SIBGRAPI-T '12, Brazil, Brazil, Aug. 22-25, 2012, XP032283171, p. 36-49, Aug. 22, 2012.

European Search Report and the European Search Opinion dated Oct. 14, 2015 From the European Patent Office Re. Application No. 14170766.1.

* cited by examiner

CREATING A SYNTHETIC MODEL WITH ORGANIC VERACITY

RELATED APPLICATION

This application claims the benefit of priority under 35 USC 119(e) of U.S. Provisional Patent Application No. 61/830,669 filed Jun. 4, 2013, the contents of which are incorporated herein by reference in their entirety.

BACKGROUND

The present invention, in some embodiments thereof, relates to creating a real time three dimensional (3D) synthetic digital model of a physical entity, and, more specifically, but not exclusively, to creating a real time synthetic model of a physical entity through surface reconstruction using point-based geometry.

Creating a synthetic model is performed to provide a visual representation of a physical entity, where the synthetic model tracks motion of the physical entity, for example, bodily motion and/or facial expressions. Auditory representation may also be included in the synthetic model to provide auditory representation of the physical entity and/or its background, for example, speech and/or background audio. The physical entity may be dynamic and/or static, for example, person(s), animal(s), other objects and/or a combination of them. The synthetic model visual and/or auditory representation of the physical entity may provide realistic physical representation, virtual representation and/or a combination of them. Virtual representation may include for example, drawing representations, character representations, fantastic representation and/or realistic representation manipulated with graphic effects. The synthetic model may be modeled in a plurality of spatial spaces, for example, two dimensions (2D) and/or three dimensions (3D). The synthetic model may be manipulated with respect to the tracked physical entity, for example, change body proportions, change face proportions, superimpose a realistic physical synthetic model with internal organs representation and/or superposition of the realistic entity over different backgrounds.

Creating the synthetic model may be used for a plurality of applications, for example, teleconferencing, medical use, entertainment, gaming, virtual and/or online communities, simulation and/or planning.

SUMMARY

According to some embodiments of the present invention, there are provided methods of creating a real time synthetic model tracking a dynamic physical entity. A plurality of points extracted from a sequence of a three dimensional (3D) information depicting a dynamic physical entity are received where each point is associated with position information and photometric information. A cloud point is identified within the plurality of points. The cloud point includes a plurality of entity representative points selected from the plurality of points. The entity representative points portray a surface of said dynamic physical entity. A points-surface of a synthetic model is generated in real time by creating spatial presentation of the plurality of entity representative points through calculation of principal curvatures for each one of the entity representative points according to their respective position information. A continuous surface is generated in real time for the synthetic model by texturing a plurality of ellipsoidal shapes for each one of the entity representative points according to their respective photometric information. The motion of the dynamic physical entity is tracked in real time by adjusting the points-surface and the continuous surface through a of plurality of iterations wherein in each iteration the reception of points, identification of cloud point, creation of points-surface and creation of continuous surface are repeated.

Optionally, the plurality of points is converted into a plurality of projective points using the position information. The plurality of projective points are independent of each other and each of said projective points maintains a local topology.

Optionally, one or more projective points are excluded from the cloud point. The excluded projective points have geometry surface coordinates which deviate by a predefined value from the mean of the plurality of the entity representative projective points.

Optionally, the orientation of the ellipsoidal shape is set according to the direction of capturing the dynamic physical entity.

Optionally, the photometric attributes of the ellipsoidal shape are set using a Gaussian distribution kernel according to the photometric information and transparency characteristics which is included as metadata available for each one of the plurality of points.

Optionally, an enhanced synthetic model is created by integrating the synthetic model with audio effects extracted from metadata which is available for each one of the plurality of points. The audio effects are collected at the environment of the dynamic physical entity.

Optionally, an enhanced synthetic model is created by integrating the synthetic model with presentation of internal organs of the dynamic physical entity which is extracted from metadata which is available for each one of the plurality of points.

Optionally, an enhanced synthetic model is created by manipulating the synthetic model to display emotional state of the dynamic physical entity according to physiological information of the dynamic physical entity which is extracted from metadata information which is available for each one of the plurality of points.

Optionally, a virtual synthetic model is created by constructing the synthetic model from an imagery source not depicting the dynamic physical entity while tracking motions of the dynamic physical entity.

Optionally, an independent synthetic model is created which analyzes movements of the dynamic physical entity and reproduces the movements independently of the dynamic physical entity.

Optionally, the synthetic model is created using open graphics library (OpenGL) employing point sprite rendering.

Optionally, the synthetic model is created using open graphics library (OpenGL) employing geometry shader.

Optionally, transformations are performed to the synthetic model or part of it to distort the presentation of the dynamic physical entity.

Optionally, the texturing of the ellipsoidal shapes is manipulated to distort the presentation of the dynamic physical entity.

Optionally, the plurality of points is stored in order to process them offline to create said synthetic model in a future time.

Optionally, the synthetic model is stored for use at a future time.

Optionally, a file format is created which is capable of digitally representing the synthetic model through a binary representation so that the synthetic model is fully reconstructed from the file.

According to some embodiments of the present invention, there are provided methods of decoding an image of a dynamic physical entity to create a synthetic model. Decoding the image begins with receiving a plurality of points extracted from a sequence of a three dimensional (3D) reconstruction depicting a dynamic physical entity. The plurality of points includes position information and photometric information. A mask is created for each specific point of the plurality of points which identifies if the specific point depicts part of the dynamic physical entity. A plurality of data packets is encoded which include the position information and the photometric information of the plurality of points. The plurality of data packets is transmitted to a remote location.

Optionally, the plurality of data packets contains 24-bit depth data and 32-bit photometric data for each of the plurality of points.

Optionally, metadata information is created for each one of the plurality of points. The metadata information is encoded into the data packets.

Optionally, audio recorded at the environment of said dynamic physical entity is received and integrated into the metadata information.

Optionally, presentation data of internal organs of the dynamic physical entity is received and integrated into the metadata information.

Optionally, physiological information of the dynamic physical entity is received and integrated into the metadata information.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to creating a real time three dimensional (3D) synthetic model of a dynamic physical entity and, more specifically, but not exclusively, to creating a real time synthetic model of a physical entity through surface reconstruction using point geometry.

According to some embodiments of the present invention, there are provided systems and methods for creating a real-time realistic synthetic model of a physical entity using point geometry representations. The basis for creating the synthetic model is treating a surface of a 3D dynamic physical entity, for example human surface and/or animal surface, as a continuous manifold of infinitely small planes which may be represented by points, where a manifold is a local topological space which may be presented through a Euclidean space of the same dimensional order.

Creating the realistic synthetic model is done by visual reconstruction of the dynamic realistic model from a plurality of points, extracted from a sequence of 3D information depicting the dynamic physical entity. The plurality of points is identified in a 3D space (having spatial coordinates) and is referred to herein cumulatively as a cloud-point. Each of the plurality of points, referred to herein as projective points, is considered as an approximation of an infinitely small plane and the manifold is expressed by the relation between each projective point and the nearest neighboring projective points. Each projective point maintains a local topology and is independent from the other projective points, thus reducing the need to maintain topological consistency over the entire visual reconstruction. Each projective point includes photometric information, for example, grayscale data and/or color data. Each projective point may include metadata information, for example alpha channel and/or temperature. Projective points which are referred to herein as entity representative points are selected in real time out of the plurality of projective points. The entity representative points portray surfaces of the physical entity, for example, skin, hair and/or cloth.

The synthetic model is structured by creating a point surface which is a spatial representation of the plurality of entity representative points. The spatial representation is obtained by calculating normal and principal curvatures for each one of the plurality of entity representative points. A continuous surface is created for the synthetic model combining ellipsoidal shapes created for each of the entity representative points according to its photometric information. The process of creating the synthetic model repeated iteratively to track the dynamic physical entity.

Optionally, an enhanced synthetic model is created by integrating the synthetic model with additional information describing the physical entity, for example, auditory information, internal organs information and/or physiological information.

Optionally, a virtual synthetic model is created by constructing a virtual avatar using a separate imagery source not depicting the physical entity and integrating it with tracking information of the physical entity. The virtual avatar depicts an object different from the dynamic physical entity but tracks the physical entity movements, for example, bodily motion and/or facial expressions.

Optionally, an enhanced virtual synthetic model is created by integrating the virtual synthetic model with the additional information describing the physical entity, for example, auditory information, internal organs information and/or physiological information.

Optionally, an independent synthetic model is created which is able to imitate the movements of the dynamic physical entity even when the dynamic physical entity is no longer moving. Imitating the dynamic physical entity may be performed by analyzing the movements of the dynamic physical entity over time and reproduce these movements even when the dynamic physical entity no longer moves and/or is unavailable.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
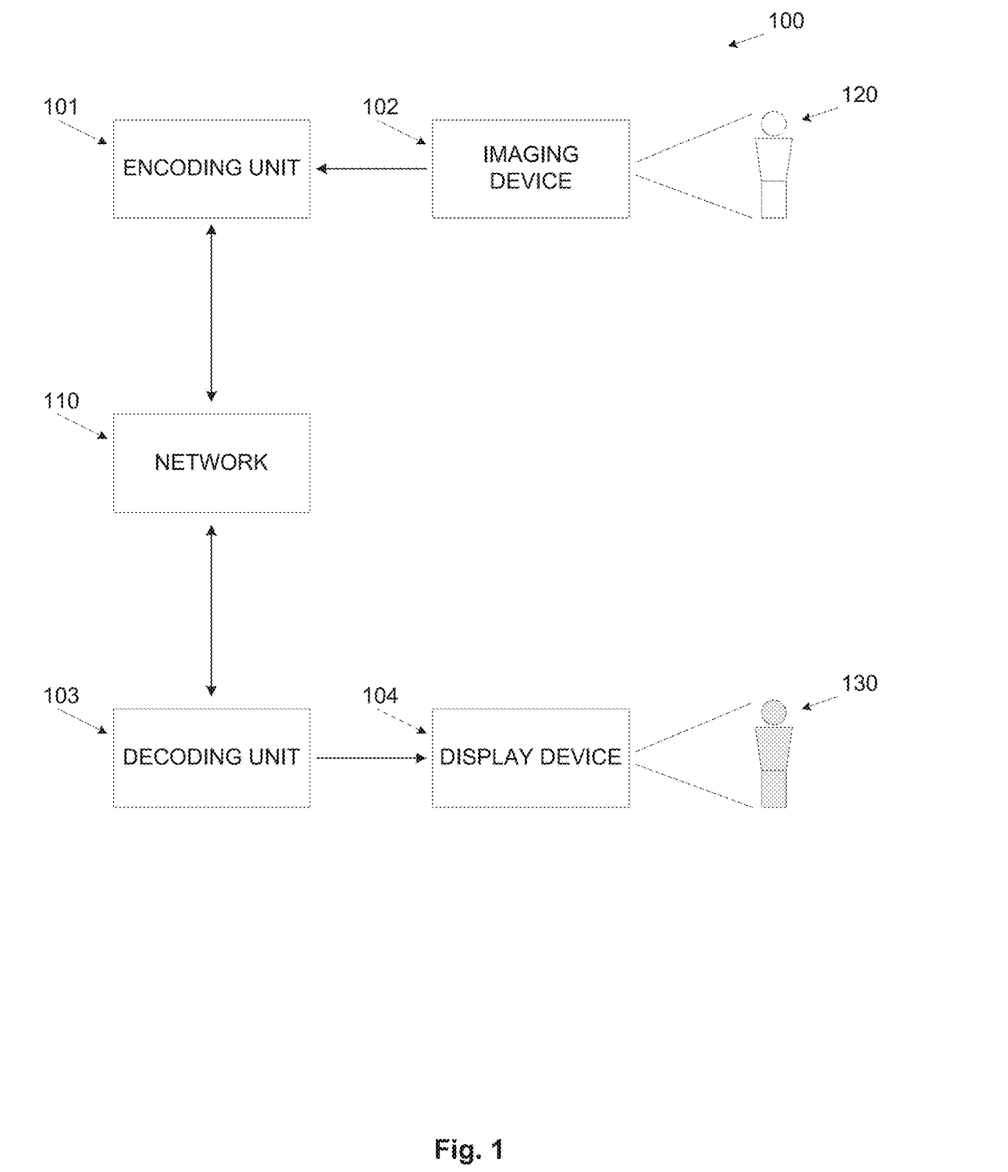
FIG. 1 is a schematic illustration of an exemplary system for creating an realistic synthetic model based on data extracted from 3D information depicting a dynamic physical entity, according to some embodiments of the present invention.

Reference is now made to FIG. 1 which is a schematic illustration of an exemplary system for creating a synthetic model based on data extracted from 3D information depicting a dynamic physical entity, according to some embodiments of the present invention. An encoding unit 101 receives 3D information depicting a dynamic physical entity 120 captured by a 3D imaging device 102, for example, depth camera, stereoscopic camera and/or X-rays computed tomography (CT) devices. A plurality of points is extracted from and/or identified in a single frame and/or a set of consecutive frames depicting the physical entity. The encoding unit 101 may be a desktop computer, laptop computer, Smartphone, tablet, server, cluster of processing nodes, computing cloud and/or any computing unit which includes a computerized processing unit capable of executing software instructions. Each one of the plurality of points includes depth i.e. position information and photometric information. The encoding unit 101 encodes the depth information and the photometric information into a plurality of data packets. Metadata may be included in the data packets, for example alpha channel and/or temperature information.

Optionally, the metadata includes additional information, for example audio information recorded at the environment of the dynamic physical entity 120, internal organs presentation information and/or physiological information, for example, heart beat rate, brain activity and/or pupil dilation. The audio may be recorded using one or more audio recording device, for example, audio recorder, voice recorder and/or noise recorder. The physiology signals may be acquired through one or more sensors attached to the dynamic physical entity 120, for example, electrocardiography (ECG) sensors, brain activity sensors and/or heart beat rate monitor.

The encoding device 101 transmits the data packets over one or more networks 110, for example, internet, cellular and/or Ethernet to a decoding unit 103. The data packets may be transmitted using one or more of a plurality of protocols, for example user datagram protocol (UDP), transmission control protocol/internet protocol (TCP/IP) and/or Stream control transmission protocol (SCTP).

The decoding device 103 receives the data packets and processes them to extract the information of the plurality of points to create a synthetic model 130 of the dynamic physical entity 120 therefrom. The synthetic model 130 may be displayed on a display device 104, for example, television, computer display, projector, Smartphone, a wearable computing device, and/or tablet. Processing of points includes converting them to projective points and selecting entity representative points which depict the dynamic physical entity 120. Processing may be repeated for a plurality of consecutive frames received from the encoding unit 101 to track the dynamic physical entity 120, for example, bodily motion and/or facial expressions.

Figure 2:
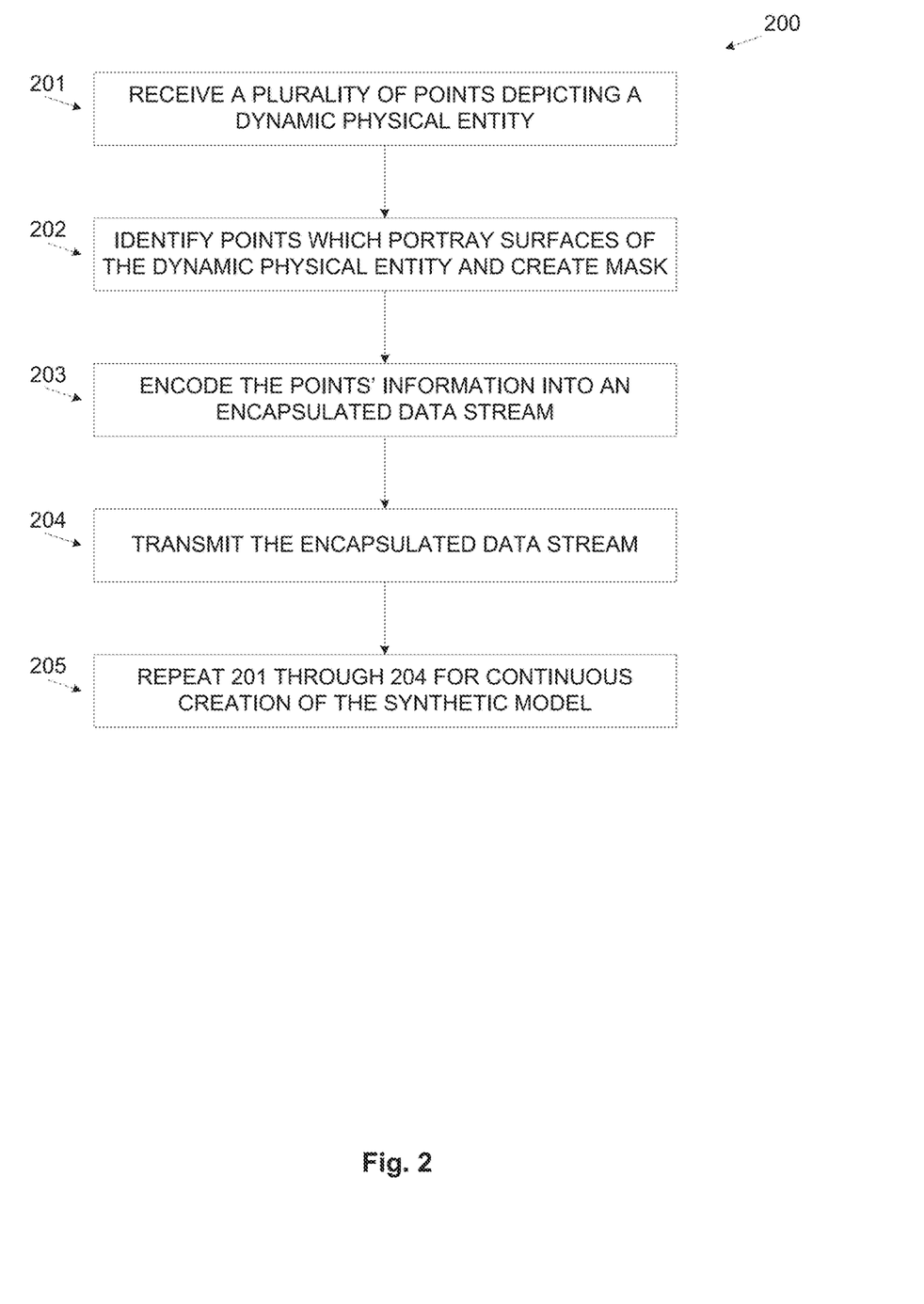
FIG. 2 is a flowchart of an exemplary process of capturing a dynamic physical entity for the purpose of creating a synthetic model, according to some embodiments of the present invention.

Reference is now made to FIG. 2 which is a flowchart of an exemplary process of capturing a dynamic physical entity for the purpose of creating a synthetic model, according to some embodiments of the present invention. As shown at 201, a process 200 which may be utilized through the exemplary system 100 starts with receiving from an imaging device such as the imaging device 102 a plurality of points extracted from a 3D information, for example, image frame and/or video stream, depicting a physical entity such as the dynamic physical entity 120. The 3D reconstruction of the dynamic physical entity 120 may constitute of a plurality of consecutive frames presenting the dynamic physical entity 120 over time.

As shown at 202, the points which depict surfaces (parts) of the dynamic physical entity 120 may be selected from the plurality of points while excluding points which portray other elements in the environment of the dynamic physical entity 120 as captured by the imaging device 102. Each of the points is assigned with a mask which identifies if the specific point depicts a surface of the dynamic physical entity 120. The mask field may be integrated into the information structure of each of the points. The points which depict surfaces of the dynamic physical entity 120 may be identified using a plurality of techniques, for example, through real-time algorithms for identification and localization of body parts, from depth image and/or through generalization of the ICP algorithm for articulated bodies. Real-time identification and localization of body parts from depth image is described in the following publication by Christian Plagemann, Varun Ganapathi, Daphne Koller and Sebastian Thrun, "*Real-time Identification and Localization of Body Parts from Depth Images*", *Robotics and Automation (ICRA), 2010 IEEE International*, pp. 3108-3113, which is incorporated herein by reference. Generalization of the ICP algorithm for articulated bodies is described in the following publication by Stefano Pellegrinia, Konrad Schindler and Daniele Nardia, "*A Generalisation of the ICP Algorithm for Articulated Bodies*", In: *Proceedings of the British Machine Vision Conference* (2008), which is incorporated herein by reference.

Optionally, the information of each of the plurality of points is represented through an intensity image for the depth/position information and a photometric image, for example, red-green-blue (RGB) image for the photometric information. The intensity image may utilize, for example, the same data structure as the standard RGB image where the intensity information consists of 16-bit data and 8-bit mask. The mask filed may identify each of the points as depicting a surface of the dynamic physical entity 120 or not. The intensity image data may be arranged with the most significant 8-bits occupying the red (R) component, the least significant 8-bits occupying the green (G) component and the 8-bit mask occupying the blue (B) component.

Optionally, additional information with respect to the user 120 is collected, for example, audio recorded at the environment of the dynamic physical entity 120, presentation information of internal organs of the dynamic entity 120 and/or physiological information of the dynamic entity 120, for example, heart beat rate, brain activity and/or pupil dilation. The additional information may be collected from one or more sensory devices.

As shown at 203, the photometric information and depth (position) information of the plurality of points is encoded into data packets using a plurality of image compression protocols, for example, moving picture experts group (MPEG) 2, MPEG 4 and/or H.264. The additional information, such as the audio data and/or physiology signals data may be transmitted in synchronization with the captured points to be used while creating a synthetic model such as the synthetic model 130.

As shown at 204, the data packets are transmitted over the network 110 using one or more of the plurality of protocols, for example UDP, TCP/IP and/or SCTP.

As shown at 205, the sequence of receiving the plurality of points as shown at 201, identifying points which portray surfaces of the dynamic physical entity 120 as shown at 202, encoding the photometric information and position information as shown at 203 and transmitting the encoded data packets over the network 110 is repeated for a additional 3D information, for example, frames so as to have the synthetic model 130 track the dynamic physical entity 120.

Figure 3:
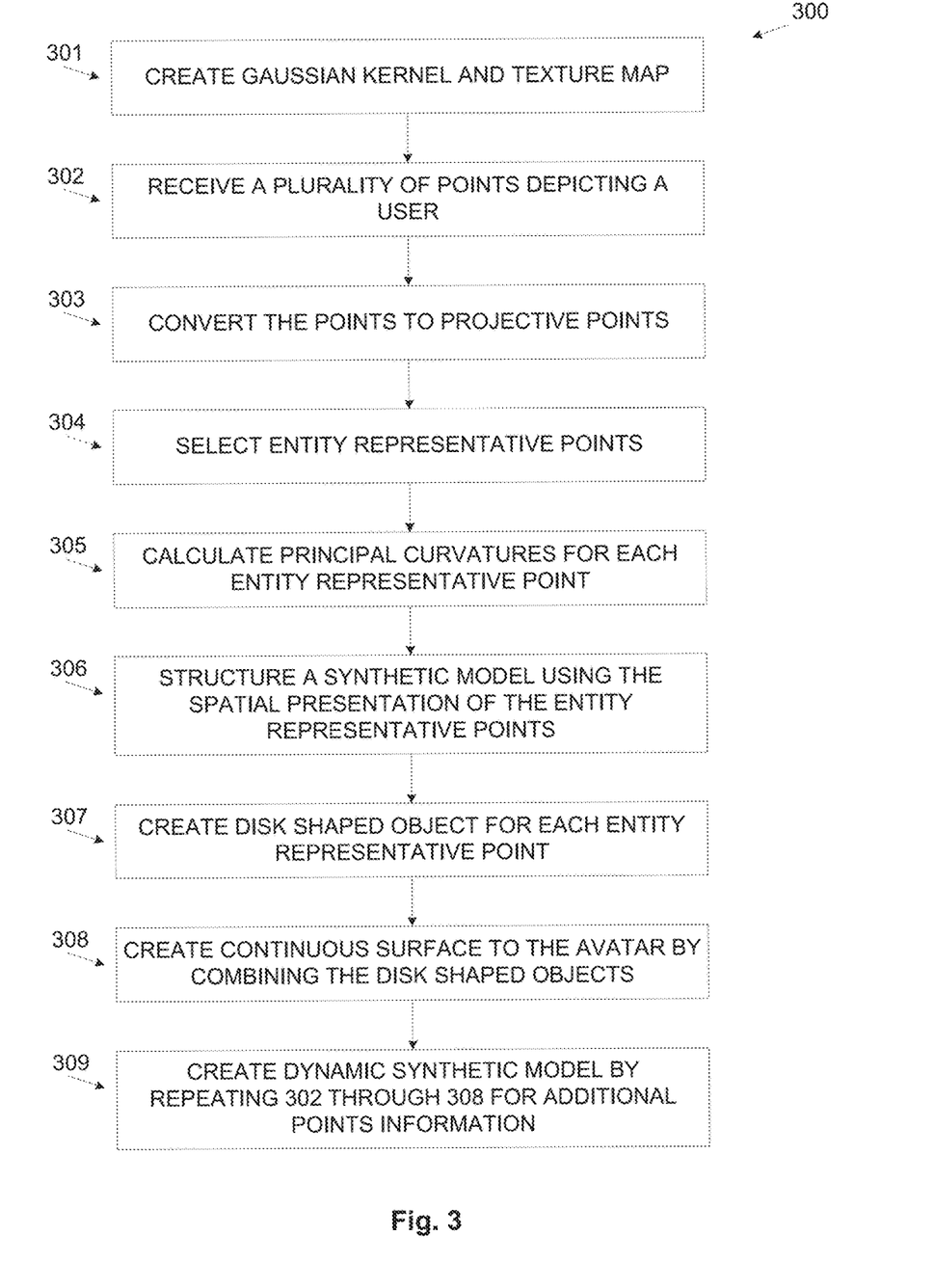
FIG. 3 is a flowchart of an exemplary process of creating a synthetic model, according to some embodiments of the present invention.

Reference is now made to FIG. 3 which is a flowchart of an exemplary process of creating a real time synthetic model, according to some embodiments of the present invention. As shown at 301, a process 300 which may be utilized through the exemplary system 100 starts with building a Gaussian kernel for texturing the synthetic model 130 and creating an alpha channel. The same Gaussian kernel is used for texturing all projective points within a frame. The same Gaussian kernel may be used for texturing all the synthetic model 130 frames which may be created for the received sequence of frames of the dynamic physical entity 120.

As shown at 302, a plurality of points depicting the dynamic physical entity 120 is received. The 3D reconstruction of the dynamic physical entity 120 may constitute of a plurality of consecutive frames presenting the dynamic physical entity 120 over time.

Optionally, the depth data is processed to enhance the model quality by employing one or more techniques, for example, disparity bilateral filter and/or bilateral filter for smoothing and de-noising the received points. The algorithm for implementing the disparity bilateral filter is described in the following publication by Yang, L. Wang, and N. Ahuja, "A constant-space belief propagation algorithm for stereo matching". In CVPR, 2010, which is incorporated herein by reference.

As shown at 303, the plurality of points is converted to a plurality of projective points by converting the depth/position information into Cartesian coordinates (x, y, z).

As shown at 304, the entity representative points are selected out of the plurality of projective points according to the mask field assigned to each of the points. The alpha channel information may be added to each of the projective points and each projective point may be constructed as a seven dimension point having, for example, (x, y, z, r, g, b, a) coordinates, where (x, y, z) provides geometry surface coordinates, r provides red color channel coordinate, g provides green color channel coordinate, b provides blue color channel coordinate and a provides alpha channel coordinate.

Optionally, one or more projective points having geometry surface coordinates which deviate by a predefined value from the mean of the plurality of projective points are excluded from the set of entity representative points. Deviation may be set through a pre-defined value with respect to the standard score of each of the projective points.

Optionally, one or more projective points which are completely transparent (as defined in their alpha channel field) are excluded from the set of entity representative points.

As shown at 305, full spatial presentation is generated in real time for each of the entity representative points by calculating for each of the entity representative points its principal curvatures $\{k_{1i} (x, y, z), k_{2i} (x, y, z)\}$ with respect to the nearest neighboring animated entity representative points. The principal curvatures are calculated after calculating a normal $\{n_i (x, y, z)\}$ for each entity representative point. The full representation of each of the entity representative points of the human model is $\{p_i (x, y, z), n_i (x, y, z), k_{1i} (x, y, z), k_{2i} (x, y, z), r_i, g_i, b_i, a_i\}$.

As shown at 306, a points-surface of the synthetic model 130 representing the dynamic physical entity 120 is created in real time through the representation of the plurality of entity representative points each having its spatial presentation. The points-surface forms a cloud point depicting the surface of the dynamic physical entity 120.

Using point geometry approach for modeling the synthetic model 130 is simpler, easier and/or faster than traditionally used approaches which employ triangle meshes. The cloud-point consisting of the plurality of projective points is a piecewise constant surface approximant where each projective point is an approximate of an infinitely small surface treated as a Euclidean space. The manifold neighborhood relation is defined by the set of the k nearest neighboring projective points. Local topological information of each projective point is used for construction of the surface of the synthetic model 130. The structure of the k nearest neighboring projective points has linear complexity in the number of projective points, similar to a polygon. Linear complexity applied to the k number of points means that the algorithms works on the structure of the k nearest neighboring projective points and that they respond, e.g., in their processing time and/or processing space requirements, to changes in input size N as O(N). Processing is done locally for each of the entity representative points and connectivity information and/or topological consistency may not be maintained thus enabling local re-sampling and/or restructure.

As shown at 307, rendering is performed by creating in real time an ellipsoidal shape without edges for the manifold of entity representative points in the point cloud where each entity representative point being an approximation of an infinitely small surface. The ellipsoidal shape is texture mapped by projecting the photometric information, for example, RGB color information (R, G and B channels) of the corresponding entity representative point over the ellipsoidal shape using a Gaussian splat. The Gaussian splat textures the ellipsoidal shapes using a Gaussian distribution of opacity according to, for example, the transparency level available from the alpha channel (a coordinate). The Gaussian splat is created once and may be used for all entity representative points of all frames. The Gaussian distribution may provide a more realistic image than linear splat as the human perceptual system is not linear and may tend to recognize Gaussian distributions as more realistic.

Optionally, the orientation of the ellipsoidal shape for each of the entity representative points with respect to the cloud point is set according to angle between the normal of the corresponding entity representative point and virtual camera direction vector.

Using point based modeling may better support modeling surfaces which do not have clear boundaries and/or form open surfaces than mesh based modeling since mesh based modeling is based on rendering triangles and/or polygons which requires setting boundaries for the rendered shapes. Point based modeling may also be advantageous for dynamic surfaces modeling while mesh may provide better modeling results on static surfaces. Mesh representation inherently creates inconsistencies since new meshes are generated for each dynamic new position of the surface. This issue is inherently solved by the point based geometry approach since it is based on local topological information being temporally independent from previous topological information and spatially independent from other points. When processing a point based model, each projective point represents a small surface locally independent from all other projective points and continuity across the complete model is not required. The projective points in 3D may be analogous to pixels in two dimensions (2D) as they are non-uniform samples of the small surface they approximate (discrete) where geometry (for 3D projective points) and appearance (for 2D pixels) are sampled at the same rate. A consistent synthetic model such as the synthetic model 130, may be created through the generation of the ellipsoidal shape for each projective point with respect to the characteristics of the respective projective point and its immediate neighboring projective points only. The exact shape and orientation of the ellipsoidal shape may be set according to one or more criteria, for example, point of view and/or point of reconstruction to create the consistent synthetic model. The Gaussian splat may provide better anti-aliasing results since solid boundaries of shapes and surfaces are avoided. The ellipsoidal shape created for each of the entity representative points does not have boundaries (edges) and its axis is a local principal curvature of the surface of the respective projective point.

As shown at 308, a continuous surface is created to from the final synthetic model 130 by composing the ellipsoidal shapes of the animated entity representative points arranged on top of each other in a back to front order.

As shown at 309, the process as shown at 302 through 308 may be repeated for a plurality of consecutive 3D information captures of the dynamic physical entity 120 to create a tracking synthetic model 130 which follows the behavior of the dynamic physical entity 120. Creation of the synthetic model 130 may be performed in real time to provide real time synthetic model 130 tracking the dynamic physical entity 120.

Optionally, the plurality of points depicting the dynamic physical entity 120 is received and stored. The stored data may be used for creating the synthetic model 130 offline and/or in a future time.

Optionally, the projective points of the synthetic model 130 and/or part of them are manipulated to transform the synthetic model 130 in a plurality of forms, for example, change synthetic model 130 orientation, change synthetic model 130 proportions, add animations to the synthetic model 130 or its parts, change the texture of the synthetic model 130 and/or integrate the synthetic model 130 with other human models, for example, internal organs models and/or physiological signals.

Optionally, rendering is enhanced by using open graphic library (OpenGL) and employing point sprite rendering and/or geometry shader. Employing programmable shaders enables very efficient implementation of high quality point-base rendering techniques. Point based rendering may provide the same performance and/or effectiveness a polygon rendering while maintaining higher signal-to-noise ratio (SNR).

Optionally, an enhanced synthetic model is created by integrating the synthetic model 130 with additional information describing the dynamic physical entity 120, for example, auditory information, internal organs information and/or physiological information to create. The additional information may provide application specific additional information, for example, medical applications requiring internal organs presentation and/or emotional presentation and/or simulation applications requiring audio presentation.

The internal organs information may include 3D models of internal organs, for example, heart, brain, digestive system and/or urinal system. The models of the internal organs may be produced using a plurality of techniques, for example, functional magnetic resonance imaging (fMRI), ultrasound imaging, x-ray CT imaging and/or artificial models. The internal organs models may not require the complexity of body surface modeling and may be created using triangle based techniques. The internal organs information may be transmitted in synch with the captured projective points to be used during real time rendering to produce the enhanced synthetic model.

The physiological information may be integrated into the enhanced synthetic model to provide a more realistic and/or natural presentation through additional presentation information, for example, display of emotions and/or display of physical condition which are perceived unconsciously by a human viewer. The physiology signals may include for example, electrocardiography (ECG), respiratory activity, brain activity, skin galvanic conductivity and/or pupil dilation. The physiology signals may be acquired through sensors attached to the dynamic physical entity 120 and transmitted in synch with the captured projective points to be used during real time rendering to produce the enhanced synthetic model. The enhanced synthetic model, for example, a human model, is integrated with the physiological information, for example, heart beat and/or brain activity. The physiology signals may be used to manipulate the created enhanced synthetic model, for example, change the photometric properties of the synthetic model 130 to display anger by adding some red hue and/or to display shock by adding some white hue, photometric properties of the brain areas and/or heart according to brain/heart activity information and/or dilate the pupils to display fear.

The auditory information may include, for example, speech, background noise and/or other audio data recorded at the environment of the dynamic physical entity 120. The auditory information recorded at the environment of the dynamic physical entity 120 may be synchronized with the captured projective points of the dynamic physical entity 120. The created enhanced synthetic model may be integrated with the recoded audio and/or manipulation of the recorded audio.

Optionally, a virtual synthetic model is created by constructing a virtual avatar using a separate imagery source not depicting a dynamic physical entity (such as the dynamic physical entity 120) and integrating it with tracking information of the physical entity. The imagery source may be, for example, drawing, photograph and/or cartoon. This allows the created virtual avatar to depict an object other than the physical entity but track the physical entity movements, for example, bodily motion and/or facial expressions.

Optionally, the virtual avatar is integrated with physical information of a dynamic physical entity (such as the dynamic physical entity 120). The virtual avatar, for example, a cube and/or a character may be integrated with the physiological information, for example heart beat and/or brain activity of the dynamic physical entity 120. The virtual avatar may also be integrated with auditory information, for example, speech and/or background sound of the dynamic physical entity 120.

Optionally, an enhanced virtual synthetic model is created by integrating the virtual synthetic model with the additional information describing the physical entity, for example, auditory information, internal organs information and/or physiological information.

Optionally, an independent synthetic model is created which is able to imitate the movements of the dynamic physical entity even when the dynamic physical entity is no longer moving. Imitating the dynamic physical entity may be performed by analyzing the movements of the dynamic physical entity over time and reproduce these movements. The independent synthetic model may present the dynamic physical entity even when the dynamic physical entity no longer moves and/or is unavailable.

Optionally, the created synthetic model is stored in order to be replayed off line and/or in a future time. The synthetic mode, the enhanced synthetic model, the modified synthetic model, the enhanced modified synthetic model and/or the independent model may be stored and used offline in a future time. One or more new file format may be created to support digital representation of the synthetic model in binary format for storage, retrieval and/or transfer of the synthetic model. The file(s) may utilize the (x, y) coordinates of the pixels for arranging the pixels in the file. Additional information, for example, (z) coordinates, photometric information, such as, for example, (R, G, B) data and/or alpha channel may also be added to the pixels structure. The file may include a header which may include a plurality of information elements, for example, scale conversion between (x) and (y) coordinates, ratio value of real world metrics of the dynamic physical entity and/or time/date of recording.

Some embodiments of the present invention include an on-line class in which a teacher (performing as the dynamic physical entity 120) using a client terminal teaches one or more students using client terminals at remote locations. The teacher communicates with the students over one or more networks, for example, cellular and/or internet. The teacher may teach the students and when taking a break, the independent synthetic model will continue the on-line class using pre-loaded teaching material after analyzing and reproducing the movements of the teacher. In another embodiment the realistic synthetic model 120 is created for the teacher and is used, independently of the teacher, to perform the on-line class where the teaching material is retrieved from a digital source, for example, on-line educational repository, digital copy of educational material and/or audio recorded classes.

Figure 4:
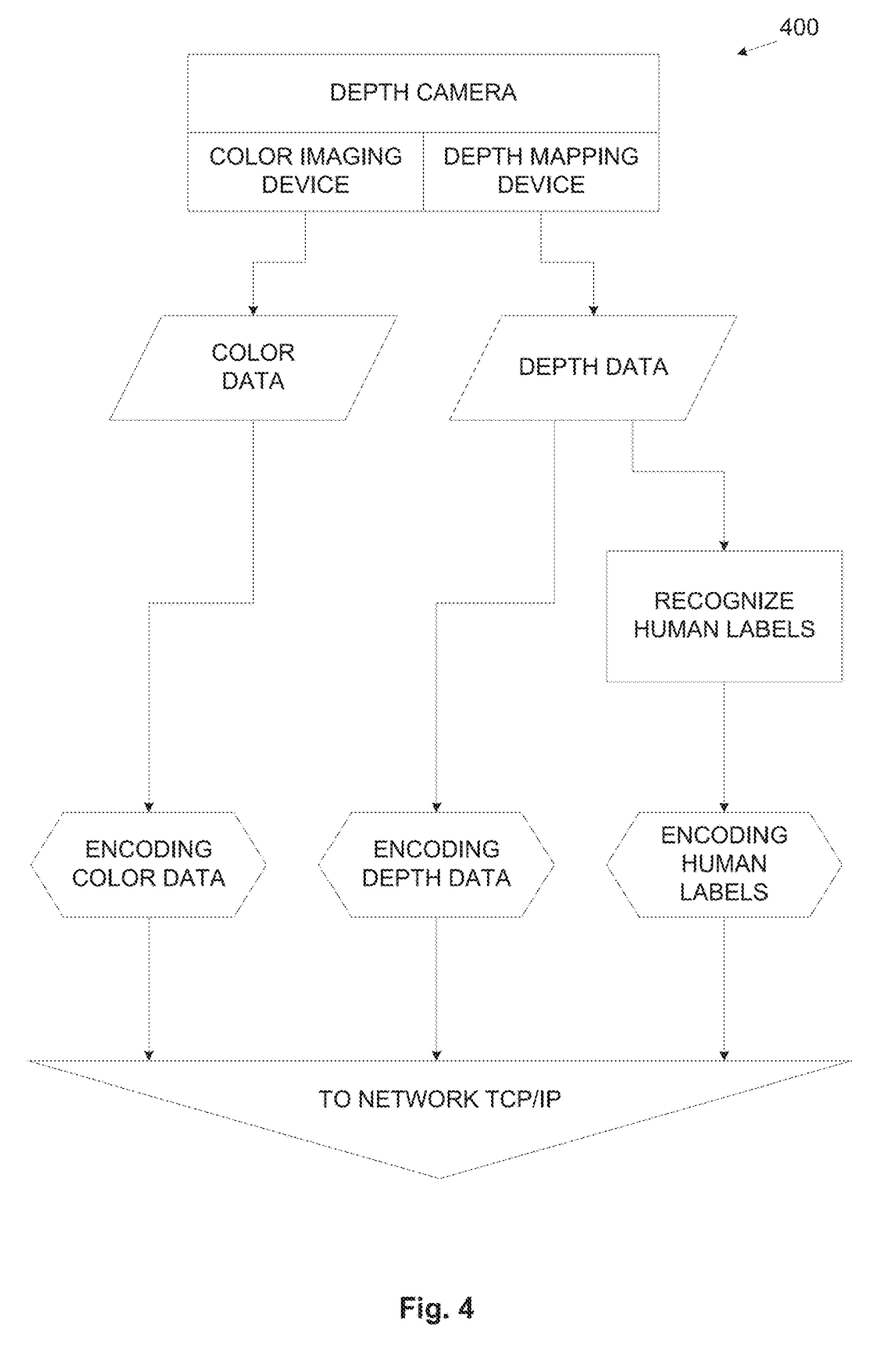
FIG. 4 is a flowchart of an exemplary process embodiment of capturing a dynamic physical entity for the purpose of creating a real-time realistic synthetic model, according to some embodiments of the present invention.

Reference is now made to FIG. 4 which is a flowchart of a process embodiment for capturing a dynamic physical entity for the purpose of creating a real time synthetic model, according to some embodiments of the present invention. A process 400 which may be performed by a decoding unit such as the encoding unit 101 starts with a depth camera capturing the dynamic physical entity 120. The depth camera includes two separate devices, a photometric imaging device and a depth mapping device. The photometric imaging device provides photometric information, for example, color data for the plurality of points constituting the 3D reconstruction and the depth mapping device provides depth data (position information) for the points.

The depth data is processed to recognize points which portray surfaces (parts) of the dynamic physical entity 120, herein referred to as human labels. A mask field is assigned to each of the points and is updated to identify the level of human parts each of the points presents.

The color data, depth data and human labels are encoded into a plurality of data packets and are transmitted over a network, such as the network 110 using TCP/IP protocol. The human labels may be integrated into the data packets as metadata.

Figure 5:
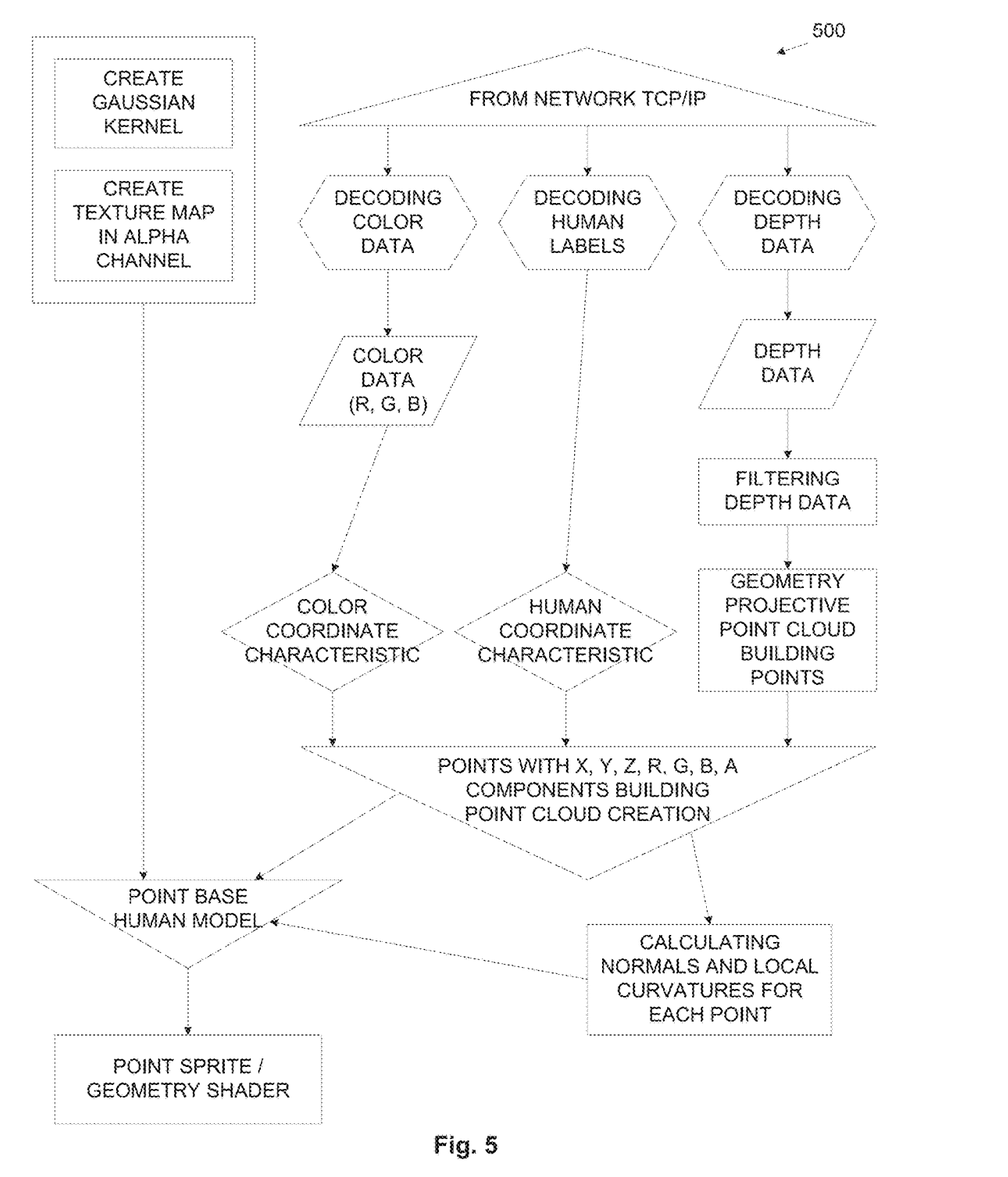
FIG. 5 is a flowchart of a process embodiment for creating a real time realistic synthetic model, according to some embodiments of the present invention.

Reference is now made to FIG. 5 which is a flowchart of a process embodiment for creating a real time synthetic model, according to some embodiments of the present invention. A process 500 which may be performed by a decoding unit such as the decoding unit 103 starts with receiving data packets over a network, such as the network 110 using TCP/IP protocol. The data packets are decoded and separated to their components—color data, depth data and human labels data.

The depth data is converted to Cartesian coordinates to create a geometry projective point cloud containing a plurality of projective points which serves as the infrastructure for creating the synthetic model such as the synthetic model 130. Prior to conversion to Cartesian coordinates, the depth data may go through a filtering process to smooth and reduce noise effects from the captured image information. Projective points which deviate from a pre-defined mean, for example having a z-score below a certain level may be excluded from the model.

The human labels (mask fields) are checked for each of the projective points and projective points having zero mask value (depict no human surface) are excluded from the model. The color data corresponding to the excluded projective points is also avoided.

Alpha channel is created for each of the projective points and point cloud is created which includes the tracked entity representative points which portray surfaces of the dynamic physical entity 120. The projective points are seven dimensional points having (x, y, z, r, g, b, a) coordinates.

Full spatial presentation is generated for each of the animated entity representative points by calculating for each of the tracked entity representative points its normal and principal curvatures with respect to the nearest neighboring tracked entity representative points.

A points-surface of the synthetic model 130 tracking the dynamic physical entity 120 is structured using the spatial presentation of the plurality of tracked entity representative points, providing a representation of the surface of the realistic human model of the synthetic model 130.

The final synthetic model construction is created by producing a continuous surface for the synthetic model 130 through point based rendering the tracked entity representative using OpenGL rendering techniques such as, sprite rendering and/or geometry shader.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating a real time synthetic model tracking a dynamic physical entity, comprising:
   a) receiving a plurality of points extracted from a sequence of a three dimensional (3D) information depicting a dynamic physical entity, each point of said plurality of points is associated with position information and photometric information;
   b) identifying a cloud point comprising a plurality of entity representative points selected from said plurality of points, said plurality of entity representative points portray a surface of said dynamic physical entity;
   c) generating in real time a points-surface of a synthetic model by creating a local spatial presentation for each of said plurality of entity representative points based on local principal curvatures calculated, using point geometry, for each of said plurality of entity representative points with respect to nearest neighboring points of said plurality of entity representative points according to a local topology of said each entity representative point extracted from said position information of said each entity representative point;
   d) generating in real time a continuous surface for said synthetic model by texturing a plurality of edgeless ellipsoidal shapes each created for a respective one of said plurality of entity representative points according to said photometric information of said respective entity representative point and composing together said plurality of textured edgeless ellipsoidal shapes; and
   e) tracking in real time a motion of said dynamic physical entity by re-creating said points-surface and said continuous surface through a of plurality of iterations wherein in each of said plurality of iterations said a)-d) are performed.

2. The method of claim 1, further comprising excluding from said cloud point at least one projective point having geometry surface coordinates which deviate by a predefined value from a mean of said plurality of entity representative points.

3. The method of claim 1, wherein orientation of said ellipsoidal shape is set according to direction of capturing said dynamic physical entity.

4. The method of claim 1, wherein photometric attributes of said ellipsoidal shape are set using a Gaussian distribution kernel according to said photometric information and transparency characteristics included as metadata which available for each one of said plurality of points.

5. The method of claim 1, further comprising creating an enhanced synthetic model by integrating said synthetic model with audio effects extracted from metadata which is available for each one of said plurality of points, said audio effects are collected at the environment of said dynamic physical entity.

6. The method of claim 1, further comprising creating an enhanced synthetic model by integrating said synthetic model with presentation of internal organs of said dynamic physical entity which is extracted from metadata which is available for each one of said plurality of points.

7. The method of claim 1, further comprising creating an enhanced synthetic model by manipulating said synthetic model to display emotional state of said dynamic physical entity according to physiological information of said dynamic physical entity which is extracted from metadata information which is available for each one of said plurality of points.

8. The method of claim 1, further comprising creating a virtual synthetic model by constructing said synthetic model from an imagery source not depicting said dynamic physical entity while tracking motions of said dynamic physical entity.

9. The method of claim 1, further comprising creating an independent synthetic model by analyzing movements of said dynamic physical entity and reproducing said movements independently of said dynamic physical entity.

10. The method of claim 1, wherein said synthetic model is created using open graphics library (OpenGL) employing point sprite rendering.

11. The method of claim 1, wherein said synthetic model is created using open graphics library (OpenGL) employing geometry shader.

12. The method of claim 1, further comprising performing transformations to said synthetic model or part of it to distort the presentation of said dynamic physical entity.

13. The method of claim 1, further comprising manipulating said texturing to distort the presentation of said dynamic physical entity.

14. The method of claim 1, further comprising storing said plurality of points in order to process said plurality of points offline to create said synthetic model in a future time.

15. The method of claim 1, further comprising storing said synthetic model for use at a future time.

16. The method of claim 15, further comprising creating a file format which is capable of digitally representing said synthetic model through a binary representation so that said synthetic model is fully reconstructed from said file.

* * * * *

UNITED STATES PATENT AND TRADEMARK OFFICE
CERTIFICATE OF CORRECTION

PATENT NO. : 10,127,719 B2
APPLICATION NO. : 14/294161
DATED : November 13, 2018
INVENTOR(S) : Miriam Reiner et al.

It is certified that error appears in the above-identified patent and that said Letters Patent is hereby corrected as shown below:

On the Title Page

Item (60) Related U.S. Application Data, Line 2, "Apr. 6, 2013" should be changed to
-- Jun. 4, 2013 --

Signed and Sealed this
Twenty-ninth Day of January, 2019

Andrei Iancu
*Director of the United States Patent and Trademark Office*